United States Patent
Epardaud et al.

(10) Patent No.: US 12,423,077 B2
(45) Date of Patent: Sep. 23, 2025

(54) MODIFYING BYTECODE TO RETURN AN ADDRESS ASSOCIATED WITH A TARGET FUNCTION

(71) Applicant: RED HAT, INC., Raleigh, NC (US)

(72) Inventors: Stephane Epardaud, Peille (FR); Georgios Andrianakis, Attica (GR)

(73) Assignee: Red Hat, Inc., Raleigh, NC (US)

( * ) Notice: Subject to any disclaimer, the term of this patent is extended or adjusted under 35 U.S.C. 154(b) by 251 days.

(21) Appl. No.: 18/080,915

(22) Filed: Dec. 14, 2022

(65) Prior Publication Data

US 2024/0184553 A1 Jun. 6, 2024

(30) Foreign Application Priority Data

Dec. 5, 2022 (GR) .................... 0220101004

(51) Int. Cl.
*G06F 8/41* (2018.01)
*G06F 8/30* (2018.01)

(52) U.S. Cl.
CPC .............. *G06F 8/447* (2013.01); *G06F 8/30* (2013.01)

(58) Field of Classification Search
CPC ... G06F 8/447; G06F 8/30; G06F 8/40; G06F 8/20
USPC ........................................... 717/110
See application file for complete search history.

(56) References Cited

U.S. PATENT DOCUMENTS

| | | |
|---|---|---|
| 8,046,748 B2 | 10/2011 | Cabillic et al. |
| 8,555,264 B2 | 10/2013 | Ohrstrom |
| 10,642,631 B1 * | 5/2020 | Gupta ................ G06F 9/54 |
| 10,747,510 B1 * | 8/2020 | Lundeen ............. G06F 8/44 |
| 2014/0173571 A1 * | 6/2014 | Gluck ................ G06F 21/54 717/130 |
| 2024/0022424 A1 * | 1/2024 | Schreck ............. H04L 9/0894 |

OTHER PUBLICATIONS

Johnson, "Intermediate Representation", 2010, [Online], pp. 1-10, [Retgrieved from internet on Aug. 5, 2024], <chrome-extension://efaidnbmnnnibpcajpcglclefindmkaj/https://citeseerx.ist.psu.edu/document?repid=rep1&type=pdf&doi=b5752a8766435f2505cf8e15db3eff1797a78b8b> (Year: 2010).*
Aldrich, "Intermediate code generation", 2016, [Online], pp. 1-53, [Retrieved from internet on Aug. 5, 2024], <https://www.cs.cmu.edu/~aldrich/courses/17-363-fa23/slides/lecture16-intermediate-generation.pdf> (Year: 2016).*
Price, Nat, "Krouton", https://github.com/nprice/krouton/commit/2fe2d767826f6b1ef45a65588164f6ae78cfa8c8, Nov. 20, 2020; pp. 1-3.

(Continued)

*Primary Examiner* — Bradley A Teets
*Assistant Examiner* — Zengpu We
(74) *Attorney, Agent, or Firm* — Kilpatrick Townsend & Stockton LLP

(57) ABSTRACT

Bytecode can be modified to adjust a returned address associated with a target function according to some examples. In one such example, a system can analyze bytecode to identify a location of a first bytecode segment that is intended to return an address for a target function. The system can then modify the bytecode to replace the first bytecode segment with a second bytecode segment at the location. The second bytecode segment can be configured to call a supplemental function that is executable to return the address for the target function.

18 Claims, 4 Drawing Sheets

(56) References Cited

OTHER PUBLICATIONS

"Type-Safe Routing", https://ktor.io/docs/type-safe-routing.html#add_dependencies, Oct. 18, 2022; pp. 1-10.
"Angular5 reverse routing", Stack Exchange, Inc., https://stackoverflow.com/questions/47752135/angular5-reverse-routing, 2022; pp. 1-3.
"Reverse Routing", https://mblink.github.io/routing/docs/reverse-routing, 2022; pp. 1-2.
"Controllers-handling HTTP requests", https://livebook.manning.com/book/play-for-java/chapter-5/; pp. 1-51.
Sparks, Malcolm, "Of Routes and Resources", https:///www.juxt.pro/blog/yada-routes, Mar. 20, 2017; pp. 1-10.

* cited by examiner

MODIFYING BYTECODE TO RETURN AN ADDRESS ASSOCIATED WITH A TARGET FUNCTION

CROSS-REFERENCE TO RELATED APPLICATION

This application claims the benefit of priority under 35 U.S.C. § 119(e) to Greek Patent Application No. 20220101004, filed on Dec. 5, 2022, the entirety of which is hereby incorporated by reference herein.

TECHNICAL FIELD

The present disclosure relates generally to modifying bytecode on a computer. More specifically, but not by way of limitation, this disclosure relates to modifying bytecode to return an address associated with a target function.

BACKGROUND

Bytecode is intermediate code that has been compiled from source code into lower-level code, which can be interpreted by an interpreter to produce executable machine code. For example, Java source code can be compiled by a Java compiler into Java bytecode, which can be interpreted by a Java interpreter to produce machine code that is executable by a virtual machine (VM) or a central processing unit (CPU). Machine code is a set of instructions that is machine-understandable. Machine code is typically in a binary (0 and 1) format that is different from the bytecode and the source code.

During the process of compiling source code into bytecode, the compiler may perform various types of validation on the source code to prevent errors. For example, the compiler can check for type safety. The compiler can check for type safety by verifying that called functions actually exist, function calls have the correct number of arguments, and that correct types of values are assigned to variables. If any of these validations fail, the compiler can throw an error. For example, the compiler can throw an error if a called function (e.g., function) does not exist. As another example, the compiler can throw an error if a function call has the wrong number of arguments. As yet another example, the compiler can throw an error if the programmer mistakenly assigned an integer value to a string variable.

DETAILED DESCRIPTION

Figure 1:
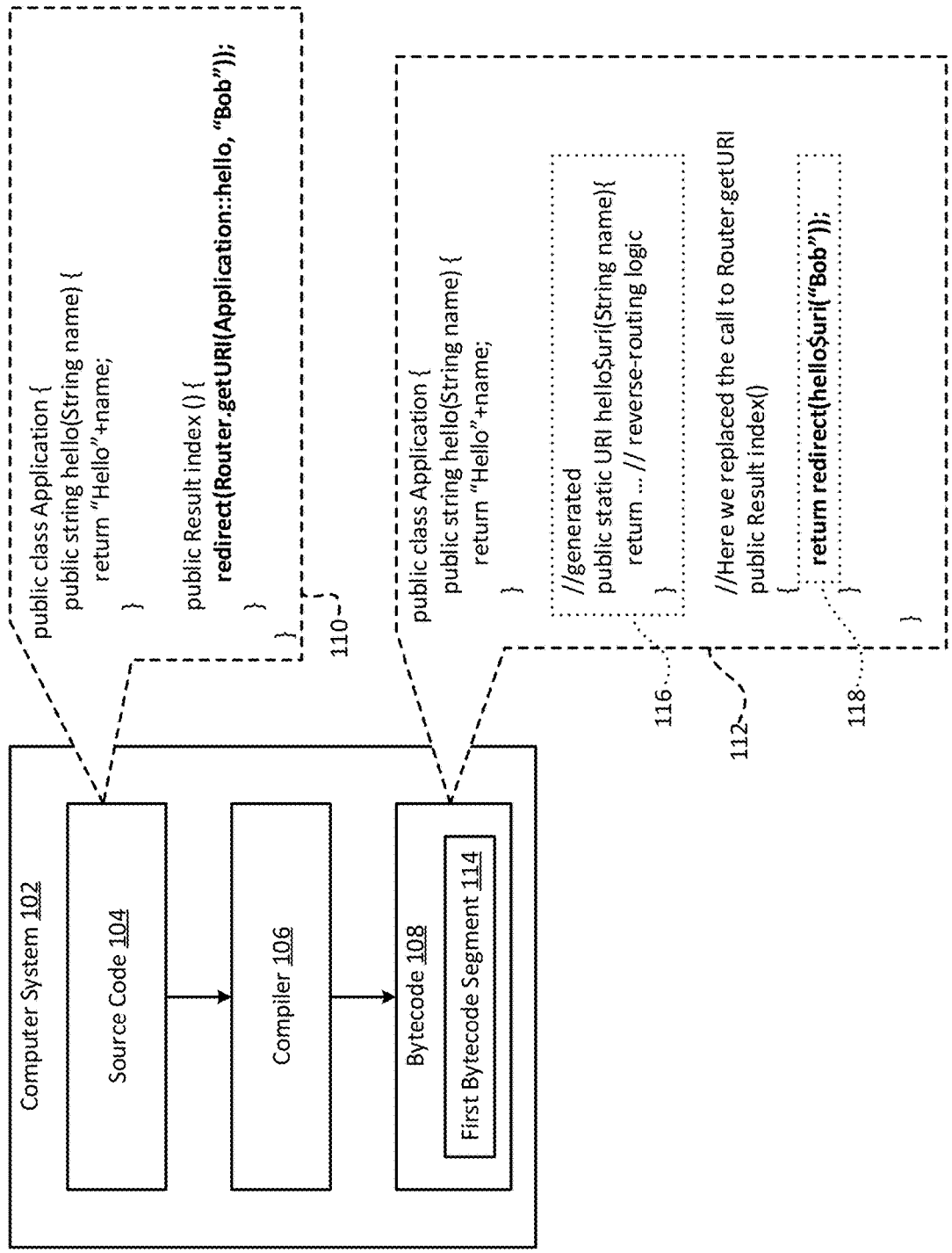
FIG. 1 shows a block diagram of an example of a computer system for modifying bytecode to return an address associated with a target function according to some aspects of the present disclosure.

Many software programs pass the name of a function as a string constant. For example, source code may contain a function named "HelloWorld". Calls to that function may be passed as a string constant with the value "HelloWorld." But passing the name of a function as a string constant can raise a variety of problems. For example, compilers do not validate strings for type safety. So if the function's name is modified for some reason (e.g., during code refactoring) and the string constant is not updated accordingly, there will be a mismatch between the string constant and the function name that will not be caught by the compiler. This mismatch may lead to runtime problems, because the program will call a function name that no longer exists.

One way to circumvent the above problem is to pass a function pointer associated with the target function, rather than the string constant. The function pointer can point to a memory address at which the target function resides. The function pointer is tied to the function name and, therefore, will be automatically updated by the code editors if the function name changes. Since function pointers are normally validated by the compiler for type safety during compilation, the mismatches described above can be avoided. Despite this advantage, using a function pointer can raise its own problems.

One problem with using function pointers is that at runtime, they do not include metadata about the pointed function. For example, source code for a software program can include the line "Router.getURl(Application::hello)." That line executes the getURl function on the function pointer "Application::hello". The goal may be to get the uniform resource locator (URl) address for the target function "hello", which exists in the class "Application." But when executed at runtime, the getURl function cannot obtain metadata about "Application:hello," such as the name or annotations of "Application::hello", necessary to obtain its URl address. Because the metadata is missing from method pointers, this line of code cannot properly function at runtime, and the URl cannot be returned for the target function "hello". Other parts of the application that directly or indirectly rely on the method pointer may also be unable to properly function at runtime.

Some examples of the present disclosure can overcome one or more of the abovementioned problems by modifying bytecode for a software program to replace a first bytecode segment with a second bytecode segment. More specifically, a computer system can compile source code for a software program into bytecode. The bytecode can include the first bytecode segment. The first bytecode segment can pass a function pointer as an argument. For example, the first bytecode segment can be similar to the above getURl line, in which the function pointer "Application::hello" is passed as an argument for the getURl function. But when executed, the first bytecode segment cannot function properly as described above. To avoid this problem, in some examples the computer system can replace the first bytecode segment with a second bytecode segment. The second bytecode segment can call a supplemental function that is configured to return the desired type of address for the target function. For example, the desired type of address can be a URl address for the target function. This can allow the correct type of address to be returned for the target function, while still allowing for type safety to be validated at compilation time because a function pointer (rather than a string) is still used in the source code to refer to the target function.

As one particular example, a web application may include multiple endpoint functions that are accessible at corresponding URls. Each endpoint function may have a corresponding name and URl. For example, the web application may include five endpoint functions that are accessible at five different URls, where each endpoint function is configured to implement some part of the overall web application. In some cases, the web framework can map URIs to their endpoint functions, so that the web framework knows which function to invoke for a given hypertext transfer protocol (HTTP) request. For example, the web framework may forward an HTTP request that is directed to a target URl to the target URl's corresponding endpoint function. This process is called routing. In some cases, the web framework can also perform reverse routing. This may involve mapping endpoint functions to their corresponding URls, so that the web framework knows which URl belongs to a given endpoint function. For instance, a user may need to be redirected to a target endpoint function. So, the framework can determine which URl that corresponds to the target endpoint function and then redirect the user to that URl.

To implement the reverse routing described above, the source code for the web application may include one or more getURl calls for an endpoint function. A pointer to the endpoint function can be passed as an argument to the getURl calls. The purpose of the getURl calls can be to determine the URl that corresponds to the endpoint function at various points in time during the execution of the source code. The source code can be compiled into bytecode that can have multiple instances of the first bytecode segment, where each instance of the first bytecode segment can correspond to one of the getURl calls. During the compilation process, the compiler can check for type safety on the source code to determine whether the function pointer is valid. But even if the function pointer is valid, at runtime the first bytecode segment cannot be implemented because function pointers lack the necessary metadata.

To help resolve this problem, after the bytecode has been generated, a computer system can automatically scan the bytecode to identify each instance of the first bytecode segment and replace it with a corresponding second bytecode segment. Each instance of the second bytecode segment can call a supplemental function. The supplemental function can be configured to return a desired type of address for the endpoint function. The supplemental function may be automatically generated by the computer system and inserted into the bytecode after compilation, so that the supplemental function can be called by the second bytecode segment at runtime. The computer system can then execute the modified bytecode to deploy the web application. Because every instance of the first bytecode segment has been replaced by a corresponding second bytecode segment, the web application can obtain the URl for the endpoint function and perform its reverse-routing functionality without experiencing the problems described above.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

FIG. 1 shows a block diagram of an example of a computer system 102 for modifying bytecode 108 to adjust a returned address associated with a target function according to some aspects of the present disclosure. The computer system 102 can include one or more computing devices. Examples of such computing devices can include servers, desktop computers, laptop computers, mobile phones, e-readers, tablets, or any combination thereof.

The computer system 102 can include source code 104 for a software project. A programmer can draft the source code 104 in any suitable programming language, such as Java. The source code 104 may be stored in one or more files on the computer system 102. The source code 104 can correspond to a web application or another type of application. The application may include reverse-routing functionality.

One example of the source code 104 is shown in dashed box 110. As shown, the source code 104 can include a class named "Application" and a function named "hello." The "hello" function can serve as a target function. The "hello" function can return the phrase "Hello [Name]," where [Name] is whatever name is passed to the function as an argument. The source code 104 also includes the line "redirect(Router.getURl(Application::hello, "Bob"))," as shown in bold. This bolded line is intended to redirect a user to a URl corresponding to the "hello" function and to pass the name argument "Bob" to that function. To refer to the "hello" function, the bolded line uses the function pointer "Application::hello," which can be validated for type safety during compilation.

After drafting the source code 104, the programmer can issue a command to a compiler 106 to compile the source code 104 into bytecode 108. The bytecode 108 can be separate from the source code 104 and have a different format than the source code 104. For example, the source code 104 can be Java source code. The compiler 106 can be a Java compiler that can translate the Java source code into Java bytecode. During the compilation process, the compiler 106 can perform one or more validations on the source code 104 to check for errors. For example, the compiler 106 can check the source code 104 for type safety. This may involve determining whether the function pointer "Application::hello" is valid. If the function pointer is valid (e.g., the corresponding function exists), the compiler may complete the compilation process without error and produce the bytecode 108.

Normally, the bytecode 108 can include a first bytecode segment 114 associated with the bolded line in the source code 104. A bytecode segment is a portion of the bytecode. Like the bolded line in the source code 104, the first bytecode segment 114 may be configured to redirect a user to a URl corresponding to the "hello" function and to pass the name argument "Bob" to that function. To refer to the "hello" function, the first bytecode segment 114 may also use the function pointer "Application::hello." But this can raise problems at runtime, because the getURl function may fail to produce the desired result at runtime (e.g., because the getURl function cannot be implemented).

To help overcome the abovementioned problem, in some examples the computer system 102 (e.g., the compiler) can automatically replace the first bytecode segment 114 with a second bytecode segment 118. In particular, the computer system 102 can scan the bytecode 108 for one or more instances of the first bytecode segment 114 and replace each instance of the first bytecode segment 114 with a corresponding instance of the second bytecode segment 118. One example of the bytecode 108 after this replacement operation is complete is shown in dashed box 112. In the dashed box 112, the second bytecode segment 118 is shown in bold. The second bytecode segment 118 replaces the first bytecode segment 114 with a function call to a supplemental function 116. Thus, the second bytecode segment 114 may also be referred to herein as "call bytecode." The supplemental function 116 can be configured to return any suitable content, such as the URl for the "hello" function. In this example, the supplemental function 116 is "hello$uri."

The supplemental function 116 may not be part of the original source code 104 drafted by the programmer. Rather, the supplemental function 116 may be automatically added to the bytecode 108 by the computer system 102 after the compilation process is complete. For example, the computer system 102 can automatically analyze the bytecode 108 to identify the first bytecode segment 114 therein. The computer system 102 can identify the first bytecode segment 114 using any suitable technique, such as bytecode matching. The computer system 102 can then automatically determine that the first bytecode segment 114 references the "hello" function, for example by parsing the first bytecode segment 114. Based on determining that the first bytecode segment 114 references the "hello" function, the computer system 102 can automatically determine target content (e.g., a target address such as a URl) for the "hello" function, generate a supplemental function 116 that returns the target content, and add the supplemental function 116 to the bytecode 108. The computer system 102 may then replace the first bytecode segment 114 with the call bytecode 118 to call the supplemental function 116.

This computer system 102 can iterate the above process to replace every instance of the first bytecode segment 114 with bytecode that calls one or more supplemental functions. For example, if the bytecode 108 includes N getURl requests involving X function pointers to X target functions, the computer system 102 can replace the N getURl requests with N instances of call bytecode that call X supplemental functions. The X supplemental functions may be automatically generated and added to the bytecode 108 by the computer system 102. Each supplemental function can correspond to one of the X target functions and can be configured to return a URl for that target function.

After the bytecode 108 has been modified as described above, the computer system 102 may execute an interpreter on the bytecode 108 to produce machine code. The machine code can then be executed by the computer system 102 (or another computer system) to run the software project. At runtime, the call bytecode 118 can call the supplemental functions, which can return the desired type of address for the target functions.

Figure 2:
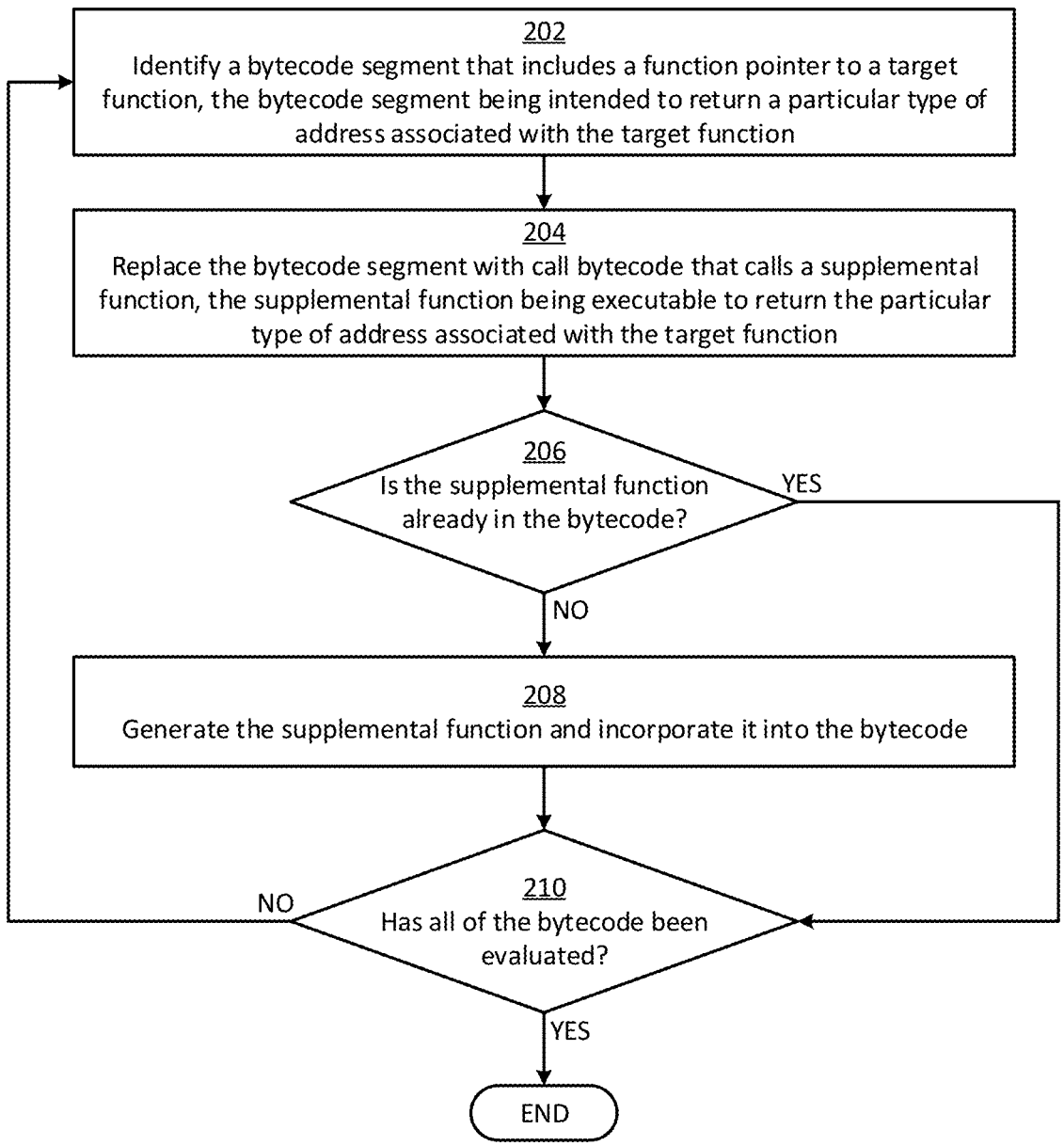
FIG. 2 shows a flowchart of an example of a process for modifying bytecode to return an address associated with a target function according to some aspects of the present disclosure.

Referring now to FIG. 2, shown is a flowchart of an example of a process for modifying bytecode to adjust a returned address associated with a target function according to some aspects of the present disclosure. Other examples may include more operations, fewer operations, different operations, or a different order of operations than is shown in FIG. 2. The operations of FIG. 2 are described below with reference to the components of FIG. 1 above.

In block 202, a computer system 102 searches bytecode 108 to identify a location of a bytecode segment (e.g., first bytecode segment 114) that includes a function pointer to a target function. The bytecode segment may be intended to return a particular type of address associated with the target function, but the bytecode segment may not function properly at runtime. The computer system 102 can identify the location of the bytecode segment using bytecode matching or any other suitable technique.

In block 204, the computer system 102 replaces the bytecode segment with call bytecode (e.g., a second bytecode segment) that calls a supplemental function. The supplemental function can be executable to return the particular type of address associated with the target function. The particular type of address can be, for example, a URl. The supplemental function may be absent from the source code 104 used to generate the bytecode 108.

In block 206, the computer system 102 determines if the supplemental function is already in the bytecode 108, for example as a result of a prior iteration of the process. If the supplemental function is already present in the bytecode 108, the process can continue to block 210. Otherwise, the process can continue to block 208.

In block 208, the computer system 102 generates the supplemental function and incorporates it into the bytecode. The computer system 102 can generate the supplemental function based on the bytecode segment. For example, the computer system 102 can parse the bytecode segment to determine the function pointer, and parse the function pointer to determine the target function. The computer system 102 can then determine information (e.g., an address such as a URl) associated with the target function and generate the supplemental function to return the determined information.

In block 210, the computer system 102 determines whether all of the bytecode 108 has been evaluated (e.g., searched). If so, the process can end. Otherwise, the process can return to block 202 and iterate. During the next iteration, the computer system 102 may identify a bytecode segment that corresponds to the same target function or a different target function as the previous iteration.

Figure 3:
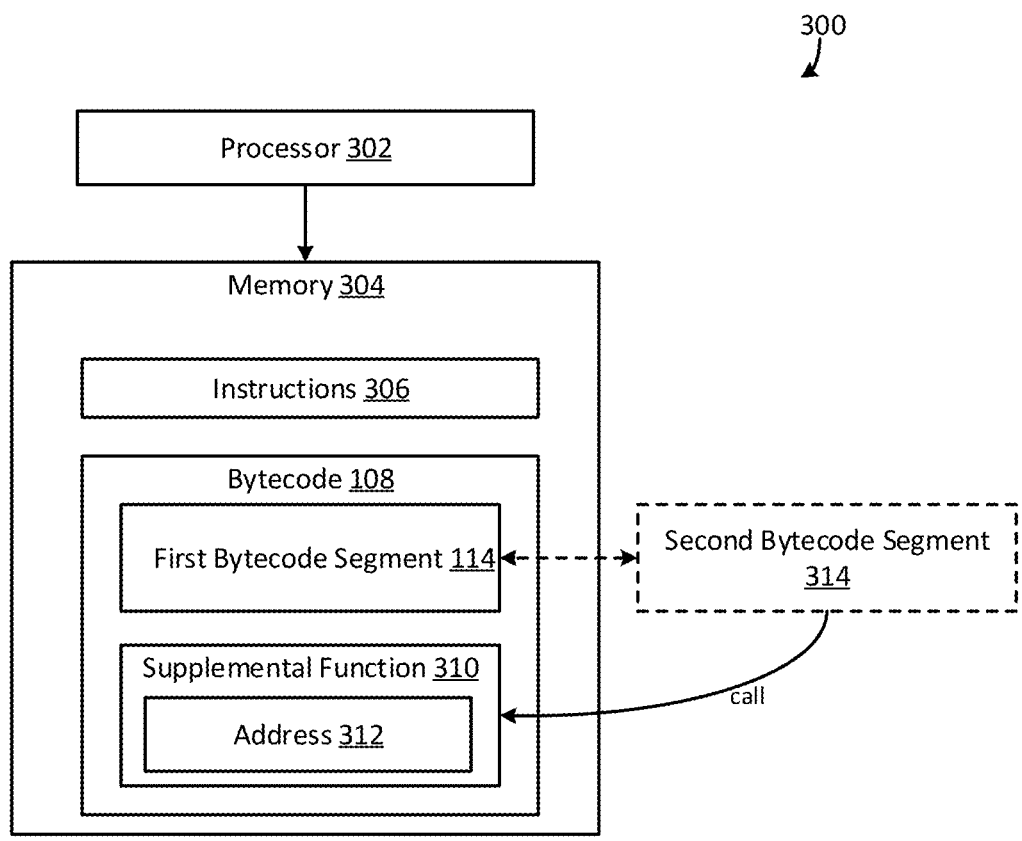
FIG. 3 shows a block diagram of another example of a system for modifying bytecode to return an address associated with a target function according to some aspects of the present disclosure.

FIG. 3 shows a block diagram of another example of a system 300 for modifying bytecode to adjust a returned address associated with a target function according to some aspects of the present disclosure. The system 300 includes a processor 302 communicatively coupled to a memory 304. The processor 302 and memory 304 are both hardware that can be integrated into a single computing device or can be distributed from one another.

The processor 302 can include one processing device or multiple processing devices. Examples of the processor 302 include a Field-Programmable Gate Array (FPGA), an application-specific integrated circuit (ASIC), or a microprocessor. The processor 302 can execute instructions 306 stored in the memory 304 to perform one or more operations. In some examples, the instructions 306 can include processor-specific instructions generated by a compiler or an interpreter from code written in any suitable computer-programming language, such as C, C++, C #, and Java.

The memory 304 can include one memory device or multiple memory devices. The memory 304 can be volatile or non-volatile (i.e., the memory 304 can retain stored information when powered off). Examples of the memory 304 include electrically erasable and programmable read-only memory (EEPROM), flash memory, or any other type of non-volatile memory. At least a portion of the memory device includes a non-transitory computer-readable medium. A computer-readable medium can include electronic, optical, magnetic, or other storage devices capable of providing the processor 302 with the instructions 306 or other program code. Examples of a computer-readable medium include magnetic disks, memory chips, ROM, random-access memory (RAM), an ASIC, a configured processor, optical storage, or any other medium from which a computer processor can read the instructions 306.

The processor 302 can execute the instructions 306 to perform operations. For example, the processor 302 can analyze bytecode 108 to identify a location of a first bytecode segment 114 that is intended to return an address for a target function. The processor 302 can then modify the bytecode 108 to replace the first bytecode segment 114 with a second bytecode segment 314 at the location. The second bytecode segment 314 can be configured to call a supplemental function 310 that is executable to return the address 312 for the target function. While this example involves the supplemental function 310 returning a particular type of address, it will be appreciated that similar principles can be used to return any other type of desired content.

Figure 4:
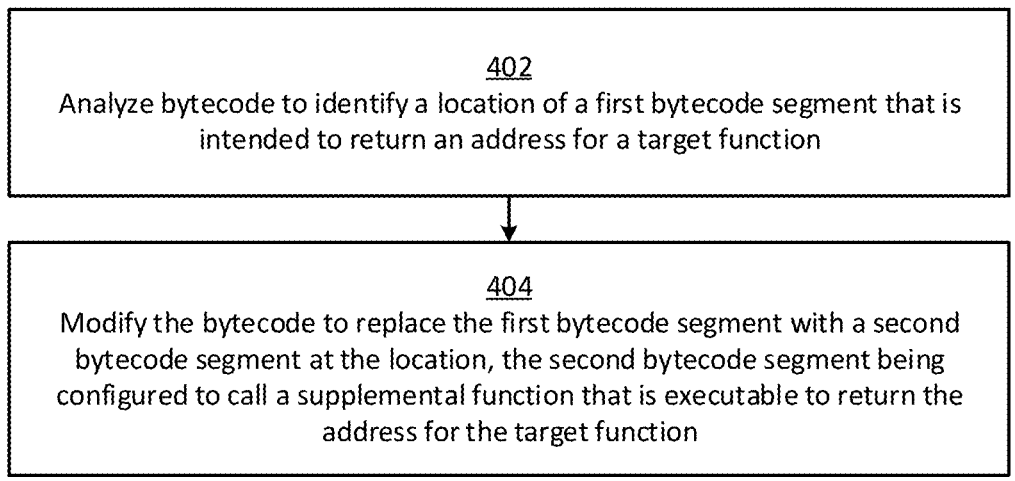
FIG. 4 shows a flowchart of another example of a process for modifying bytecode to return an address associated with a target function according to some aspects of the present disclosure.

FIG. 4 shows a flowchart of another example of a process for modifying bytecode to adjust a returned address associated with a target function according to some aspects of the present disclosure. Other examples may include more operations, fewer operations, different operations, or a different order of operations than is shown in FIG. 4. The operations of FIG. 4 are described below with reference to the components of FIG. 3 above.

In block 402, the processor 302 analyzes bytecode 108 to identify a location of a first bytecode segment 114 that is intended to return an address for a target function. One example of the target function can be the "hello" function described above with respect to FIG. 1.

In block 404, the processor 302 modifies the bytecode 108 to replace the first bytecode segment 114 with a second bytecode segment 314 at the location. This may involve removing the first bytecode segment 114 from the location and inserting the second bytecode segment 314 at the location. The second bytecode segment 314 can be configured to call a supplemental function 310 that is executable to return the address 312 for the target function.

The above description of certain examples, including illustrated examples, has been presented only for the purpose of illustration and description and is not intended to be exhaustive or to limit the disclosure to the precise forms disclosed. Modifications, adaptations, and uses thereof will be apparent to those skilled in the art without departing from the scope of the disclosure. For instance, any examples described herein can be combined with any other examples.

The invention claimed is:

1. A non-transitory computer-readable medium comprising program code that is executable by one or more processors for causing the one or more processors to:
generate bytecode by compiling source code into the bytecode, wherein the source code excludes a supplemental function;
analyze the bytecode to identify a location of a first bytecode segment that is intended to return an address for a target function; and
modify the bytecode to replace the first bytecode segment with a second bytecode segment at the location, the second bytecode segment being configured to call the supplemental function that is executable to return the address for the target function.

2. The non-transitory computer-readable medium of claim 1, wherein the first bytecode segment is unable to return the address when executed at runtime.

3. The non-transitory computer-readable medium of claim 1, wherein the address is a uniform resource locator (URl).

4. The non-transitory computer-readable medium of claim 1, wherein the first bytecode segment corresponds to a getURl function in Java.

5. The non-transitory computer-readable medium of claim 1, further comprising program code that is executable by the one or more processors for causing the one or more processors to:
generate the supplemental function; and
incorporate the supplemental function into the bytecode.

6. The non-transitory computer-readable medium of claim 1, further comprising program code that is executable by the one or more processors for causing the one or more processors to:
analyze the bytecode to identify a third bytecode segment that is intended to return a particular type of address for another target function; and
modify the bytecode to replace the third bytecode segment with a fourth bytecode segment, the fourth bytecode segment being configured to call another supplemental function that is executable to return the particular type of address for the other target function.

7. The non-transitory computer-readable medium of claim 1, wherein the target function is an endpoint function associated with a web application.

8. The non-transitory computer-readable medium of claim 1, wherein the bytecode defines a reverse-routing program, the reverse-routing program being configured to translate function names to uniform resource identifiers, wherein the function names are for endpoint functions for a web application, and wherein the uniform resource identifiers are usable to access the endpoint functions.

9. The non-transitory computer-readable medium of claim 1, wherein the first bytecode segment includes a function pointer to the target function.

10. A method comprising:
generating, by one or more processors, bytecode by compiling source code into the bytecode, wherein the source code excludes a supplemental function;
analyzing, by the one or more processors, the bytecode to identify a location of a first bytecode segment that is intended to return an address for a target function; and
modifying, by the one or more processors, the bytecode to replace the first bytecode segment with a second bytecode segment at the location, the second bytecode segment being configured to call the supplemental function that is executable to return the address for the target function.

11. The method of claim 10, wherein the first bytecode segment is unable to return the address when executed at runtime.

12. The method of claim 10, wherein the address is a uniform resource locator (URl).

13. The method of claim 10, wherein the first bytecode segment corresponds to a getURl function in Java.

14. The method of claim 10, further comprising:
generating the supplemental function; and
incorporating the supplemental function into the bytecode.

15. The method of claim 10, further comprising:
analyzing the bytecode to identify a third bytecode segment that is intended to return a particular type of address for another target function; and
modifying the bytecode to replace the third bytecode segment with a fourth bytecode segment, the fourth bytecode segment being configured to call another supplemental function that is executable to return the particular type of address for the other target function.

16. The method of claim 10, wherein the bytecode defines a reverse-routing program, the reverse-routing program being configured to translate function names to uniform resource identifiers, wherein the function names are for endpoint functions for a web application, and wherein the uniform resource identifiers are usable to access the endpoint functions.

17. The method of claim 10, wherein the first bytecode segment includes a function pointer to the target function.

18. A system comprising:
one or more processors; and
one or more memories including instructions that are executable by the one or more processors for causing the one or more processors to:

generate bytecode by compiling source code into the bytecode, wherein the source code excludes a supplemental function;

analyze the bytecode to identify a location of a first bytecode segment that is intended to return an address for a target function; and modify the bytecode to replace the first bytecode segment with a second bytecode segment at the location, the second bytecode segment being configured to call the supplemental function that is executable to return the address for the target function.

\* \* \* \* \*